Patented Dec. 5, 1922.

1,437,419

UNITED STATES PATENT OFFICE.

RALPH V. HEUSER, OF BURRAGE, MASSACHUSETTS, ASSIGNOR TO ATLANTIC DYE-STUFF COMPANY, OF BURRAGE, MASSACHUSETTS, A CORPORATION OF MASSACHUSETTS.

METHOD OF PRODUCING TRITOLYLGUANIDIN.

No Drawing.   Application filed January 27, 1921.   Serial No. 440,517.

*To all whom it may concern:*

Be it known that I, RALPH V. HEUSER, citizen of the Confederation of Switzerland, and resident of Burrage, in the county of Plymouth and State of Massachusetts, have invented new and useful Improvements in Methods of Producing Tritolylguanidin, of which the following is a specification.

My invention consists of a method of producing tritolylguanidin; for illustration the method will be specifically described in its application to the production of triorthotolylguanidin, with only such allusions to the manufacture of the para and meta isomers as will point out variations in process appropriate thereto.

In the manufacture of triorthotolylguanidin by this method, the preparatory materials used are diorthotolylthiourea, orthotoluidin, and lead oxid. To obtain diorthotolylthiourea, react upon orthotoluidin with carbon bisulfid, at a temperature about 30° C. The reaction is expressed by the equation:

The reaction requires several days for completion. Even at the moderate temperature of 30° C., the escaping hydrogen sulfid carries with it an appreciable quantity of carbon bisulfid. This can be economically recovered by passing the escaped gases through cold orthotoluidin, which acts as a solvent for carbon bisulfid; by this means a charge of orthotoluidin is prepared by its absorption of relatively small quantities of carbon bisulfid, for later treatment with larger quantities of carbon bisulfid at a higher temperature, for the production of ditolylthiourea. The hydrogen sulfid recovered, will be available for miscellaneous reduction processes, or for the manufacture of sodium sulfid.

The above described reaction for ditolylthiourea may be suitably carried on in shallow iron tanks, with provision for withdrawal of the gases and facilities of turning the charge from time to time. Continuous mechanical stirring, while beneficial, is not indispensable; if it is desired, a "Bufflokast" crystallizer will be a convenient and effective apparatus.

When a charge has become nearly dry, and the odor of carbon bisulfid can no longer be detected, it is tested for the amount of ditolylthiourea and free orthotoluidin.

Then, for the production of triorthotolylguanidin, the requisite additional quantity of orthotoluidin, and lead oxid, are supplied; the latter in about 15% excess over the theoretically required quantity.

If only the theoretically requisite quantity of orthotoluidin is employed for the triorthotolylguanidin reaction, alcohol should be used as a solvent medium. But, if an excess of orthotoluidin, of about 50% over the theoretically required quantity, be used, the reaction product remains sufficiently thin to allow the reaction to proceed to substantial completion.

The lead oxid should be finely powdered; vigorous mechanical agitation, preferably involving a grinding action, should be kept up during the reaction. The triorthotolylguanidin reaction is carried out at 100° C.; the time required for completion is variable according to the thoroughness of the mechanical agitation, which accelerates it; several hours are required in any case.

The triorthotolylguanidin reaction above described is that of one molecule of diorthotolylthiourea with one molecule of orthotoluidin and one molecule of lead oxid, and is expressed by the equation:

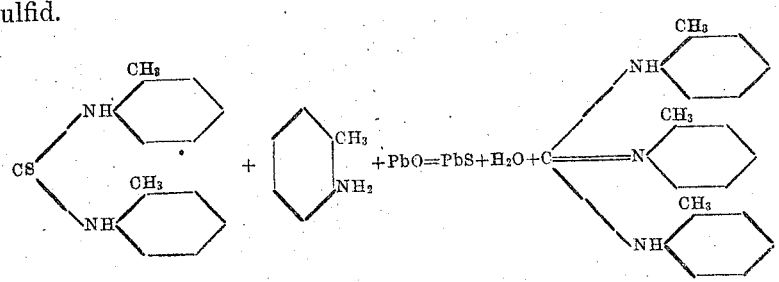

When the triorthotolylguanidin reaction is substantially complete, the excess of orthotoluidin is distilled off by means of steam or under partial vacuum if desired. The temperature of the whole is raised to 130° C. or thereabouts, so as to retain the reaction product in fused condition and permit its withdrawal either through a draw-off cock in the bottom of the container, or by ladling out.

This product is then allowed to cool and solidify. It consists essentially of a mixture of triorthotolylguanidin and lead sulfid. These constituents are then separated by first finely crushing and powdering the mixture and then dissolving the triorthotolylguanidin in a moderately warm dilute sulfuric acid. Sulfuric acid is to be preferred over hydrochloric acid, to guard against any lead compound passing into solution. Since the final product is intended for use as an accelerator of rubber vulcanization, lead compounds, particularly lead oxid, are considered very detrimental. A slight excess of dilute sulfuric acid is required to leach out the guanidin derivative from the mixed reaction product. The acid solution (triorthotolylguanidin salt) is filtered and the lead sulfid sludge washed and dried; this may then be taken to the smelting plant and recovered as lead oxid. The filtrate is run slowly into a vat containing a sufficient amount of alkali, e. g. sodium carbonate or caustic soda, in very dilute solution; there the triorthotolylguanidin is precipitated. Vigorous agitation of the alkaline solution should be maintained, in order to ensure a finely divided precipitate. This precipitate is filtered out, washed free from sulfate (e. g. sodium sulfate) and then dried at a temperature of about 70° C.

The physical properties of this triorthotolylguanidin render it in all respects acceptable as an accelerator or rubber vulcanization. When mixed with rubber and a vulcanizing agent in the usual manner—employing from one to two per cent of the triorthotolylguanidin on the weight of the rubber, this compound accelerates the vulcanization of the rubber in the molds with high efficiency, and is at the same time easy and safe to handle in its normal condition, and quite innocuous during the grinding operation.

If the para or meta isomers of triorthotolylguanidin are to be produced, the preparatory materials are, respectively diparatolylthiourea and paratoluidin, or dimetatolylthiourea and metatoluidin; lead oxid being employed in each case, as with the ortho preparatory materials. The separation of the para or meta tritolylguanidin from the lead sulfid requires an appropriate solvent. The para isomer, for instance, is only slightly soluble in dilute mineral acids, and its separation from the lead sulfid may be effected by the use of chlorbenzol, in which the triparatolylguanidin is readily soluble.

The preparatory process herein described, for the manufacture of ditolylthiourea, is the subject of an application for United States Letters Patent, Serial No. 440516 filed by me concurrently herewith.

The process of rubber vulcanization and the vulcanizable compound, characterized by the use and presence of tritolylguanidin, and above briefly described, are the subject matter of another application for United States Letters Patent, Serial No. 440,518 filed by me concurrently herewith.

What I claim and desire to secure by Letters Patent, is:

1. The method of preparing tritolyguanidin which comprises reaction on ditolylthiourea with toluidin and lead oxid, the toluidin in such excess of the theoretically required quantity as to render the reaction product sufficiently thin to permit substantial completion of the reaction.

2. The method of preparing triorthotolylguanidin, which comprises reacting on diorthotolylthiourea with orthotoluidin and lead oxid, the orthotoluidin in such excess of the theoretically required quantity as to render the reaction product sufficiently thin to permit substantial completion of the reaction.

Signed by me at Boston Massachusetts, this twentieth day of January, 1921.

RALPH V. HEUSER.